United States Patent [19]

Christenson

[11] Patent Number: 5,314,007
[45] Date of Patent: May 24, 1994

[54] AIR COOLER FOR LPG VEHICLES

[76] Inventor: Gary M. Christenson, 1924 Continental St., Costa Mesa, Calif. 92627

[21] Appl. No.: 115,758

[22] Filed: Sep. 3, 1993

[51] Int. Cl.⁵ .......................... B60H 1/32; F25D 7/00
[52] U.S. Cl. .......................................... 165/43; 62/7; 165/41; 123/557
[58] Field of Search .................. 165/41, 43; 62/7; 123/557

[56] References Cited

U.S. PATENT DOCUMENTS

| | | | |
|---|---|---|---|
| 2,028,069 | 1/1936 | Horton | 62/7 |
| 2,183,452 | 12/1939 | Gibbs et al. | 62/7 |
| 2,224,740 | 12/1940 | Melcher | 62/7 |

FOREIGN PATENT DOCUMENTS 2158183  5/1973  Fed. Rep. of Germany ............. 62/7

Primary Examiner—Albert W. Davis, Jr.
Attorney, Agent, or Firm—James D. Thackrey

[57] ABSTRACT

The combination of a converter in which liquid petroleum gas is changed in phase from liquid to gas preparatory to fueling an internal combustion engine by adding heat from a fluid, a dual three-way valve, an air-fluid heat exchanger in a human-occupied compartment (the cab), and a fluid circulation system independent of the internal combustion engine cooling system. The dual three-way valve's position either directs engine coolant tapped from the engine through the converter and air-fluid heat exchanger, partially cooling the cab, or directs fluid from the independent fluid circulation system through the converter and air-fluid heat exchanger, fully cooling the cab. As an alternate embodiment for installations when engine coolant can become temporarily too hot to exit the inverter below ambient cab temperature, an independent bypass may be incorporated.

2 Claims, 1 Drawing Sheet

AIR COOLER FOR LPG VEHICLES

BACKGROUND OF THE INVENTION

1. Field of the Invention

Means to supply cooled air to the cab of any apparatus having an engine fueled by liquid petroleum gas.

2. Description of Prior Art

The prior art consists of a separate refrigeration system for air cooling, driven by shaft horsepower extracted from the engine. This system has been virtually universal for decades. It has been quite satisfactory until recent environmental concerns have arisen about leakage of the refrigerant fluid, which is virtually always fluorinated and chlorinated hydrocarbons believed to be detrimental to creation of ozone in the upper atmosphere, and presently scheduled to be severely restricted or banned by law in the United States. Any refrigeration fluids which may be eligible for substitution in such systems are likely to be much more costly, to require considerable mechanical changes in the compressor, expansion valve, condenser, or evaporator (expansion coil), and/or to have more severe corrosive properties.

SUMMARY OF THE INVENTION

My invention is a combination of state-of-the-art components applicable only to engines which are fueled by liquefied petroleum gas (LPG) of various chemical compositions. Advantage is taken of the fact that the liquid state of the fuel (necessary for compact ambient-temperature storage) must be transformed into the gaseous state to achieve simple and reliable carburetion and subsequent ignition. This change of state requires heat to be supplied to the liquid fuel, in a converter such as a propane converter. Although the usual practice is to obtain that heat from the engine coolant circuit, my invention allows heat to be taken from the passenger/driver compartment for this purpose, thus cooling the cab. Although the amount of heat extracted from the cab is dictated by the engine's demands instead of being selected by the human driver or passenger (as occurs when refrigeration systems are employed), the invention dispenses entirely with moving machinery and dynamic seals with obvious reductions in cost and leakage. Moreover, a simple and well-developed three-way-valve is the only moving part. The function of this valve is to switch from extracting the heat from the cab to extracting the heat from the engine coolant circulating system.

The physical arrangement of this invention is provision for the conventional connection of engine coolant, from a higher-pressure point, through the switchable dual three-way valve to the propane converter (in the preferred embodiment), back through the dual three-way valve, and to a lower-pressure point in the engine coolant path. Added to this is another circuit using ethylene glycol or engine coolant and directing this fluid from the discharge port of an electrically powered centrifugal pump, through its own ports on the dual three-way valve to the propane converter, out of the propane converter to the passenger compartment heater (heat exchanger), back through the dual three-way valve, past an air separator and into the centrifugal pump inlet. The two positions of the shaft of the dual three-way valve determine whether the engine-coolant circuit or the heater circuit will be supplying the heat needed in the propane converter to vaporize and warm the propane sufficiently to prevent icing of the converter or in the conventional engine carburetor.

DETAILED DESCRIPTION OF INVENTION

Figure 1:
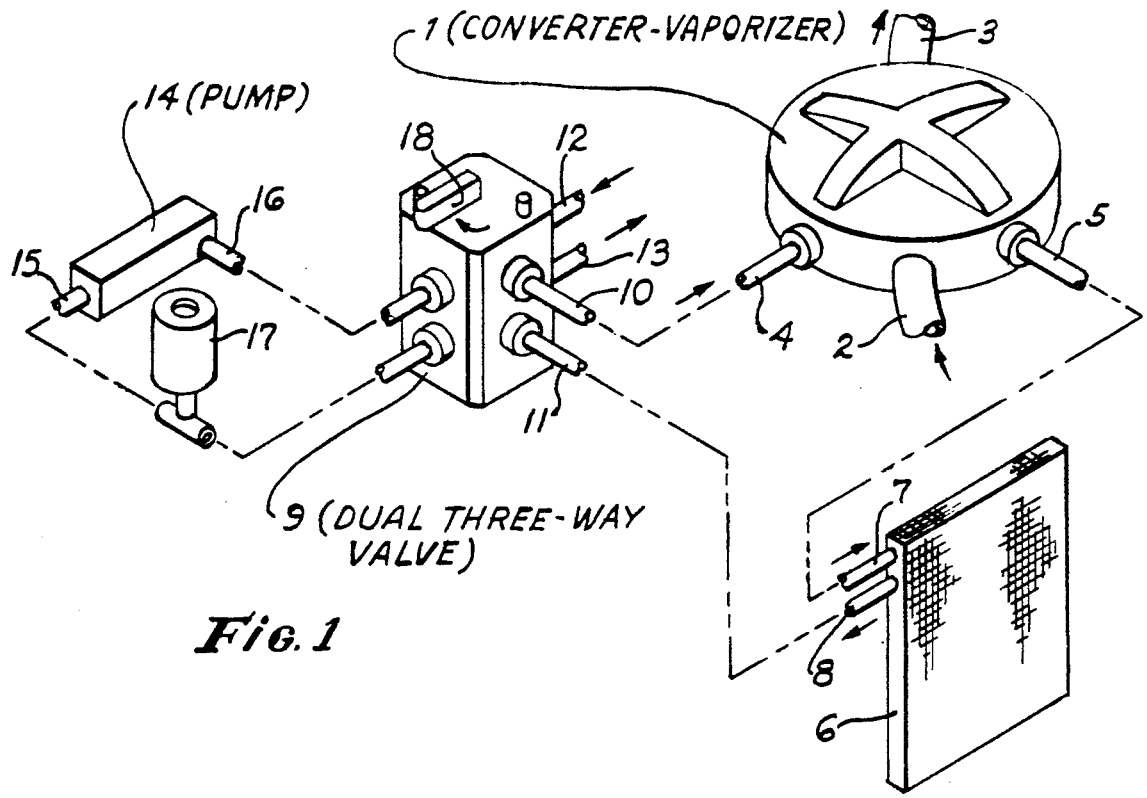
FIG. 1 is a schematic view of a typical, preferred embodiment of my invention showing elements of the combination in perspective.

Referring to FIG. 1, functioning in the conventional way (which corresponds to the second alternative position of dual three-way valve 9) pressurized engine coolant tube 12 supplies hot circulating liquid, tapped from the engine pump (not shown) which circulates liquid through the radiator heat exchanger (no shown) to dual three-way valve 9 consisting of first three-way valve 10 and second three-way valve 11. (These valves are designated herein by the numeral for their always-active port.) This stream of liquid exits three-way valve 10 and enters LPG converter 1 through heat transfer in-port 4. The stream gasifies the liquid petroleum gas (LPG) entering converter 1 at entrance port 2, which then exits at exit port 3, while the stream of cooled liquid exits at outflow port 5. The effluent from exit port 3 goes to the engine, while the cooled liquid outflow from 5 goes directly to air-fluid heat exchanger 6, entering at fluid inlet port 7 and exiting at fluid outlet port 8. Port 8 conveys the fluid back to the second three-way valve 11 where it is directed to the engine coolant return line 13. Functionally, this arrangement is similar to the prior art except that the cooled engine coolant passes through a heat exchanger in the human-occupied passenger compartment before going back to the engine. The heat exchanger may be the evaporator coil in a no-longer-functional air refrigeration system, or a compartment heater, either of which ordinarily has a fan with which the output of the air side of the heat exchanger 6 can be monitored or controlled by the occupant. This mode of operation of my invention supplies heat of LPG vaporization partly from engine coolant and partly from the human-occupied compartment.

The second mode of operation (corresponding to the first alternative position of dual three-way valve 9) occurs when the dual three-way valves are in their first alternative position. In this case LPG converter 1 obtains the fluid entering fluid inflow port 4 through first three-way valve 10 and centrifugal pump 14 discharge port 16. The flow path of fluid through LPG converter 1 and air-fluid heat exchanger 6 back to the second three-way valve 11 remains as formerly described, but on leaving three-way valve 11 the fluid is freed of any entrapped or entrained air in air-separator vessel 17 before entering centrifugal pump 14 at inlet port 15. As there is no source of heat for the circulating fluid other than the air-fluid heat exchanger 6 in the human-occupied compartment, essentially all the heat of LPG vaporization is supplied from heat exchanger 6.

Although there is no direct mixing of fluid in the two circuits described above, in the preferred embodiment both are largely ethylene glycol with a minimum of water admixed.

As exists with virtually every system devised by man, inputs by the various parts of the system need to be coordinated with one another in order that the system function as intended. This coordination is a technical matter thoroughly familiar to those skilled in the art and unrelated to invention. In my air cooling system, the parts needing coordination are the temperature of the engine coolant supplied, the differential of pressure between pressurized engine coolant tube 12 and return line 13 and the resistance to engine coolant flow presented by the individual parts of the coolant flow circuit, all of which affect how much engine heat reaches the LPG in converter 1 and therefore the temperature level of engine coolant reaching air-fluid heat exchanger 6. Whether this temperature level is cooler than the ambient atmospheric air in the human-occupied compartment or not also depends on ambient-air temperature. The above remarks apply to the second alternative, when engine coolant is used. In the second alternative the working fluid assumes whatever temperature the balancing of heat given to the LPG and to its surroundings (including air-fluid heat exchanger 6) permits.

It being clear that the factors discussed in the paragraph above depend heavily on the design and the operating power level of the internal combustion engine, as well as the characteristics of the elements combined to constitute my invention, case-by-case application must be left to those skilled in the art rather than attempting to discuss various applications of my invention here. Only one possibility needs further discussion; the possible instance in which the temperature of engine coolant to the air-fluid heat exchanger becomes temporarily high, resulting in heating rather than cooling the human-occupied compartment on a regular basis when the dual three-way valve is set to the second alternative position (set for less-than-maximum cooling). In this specific case the preferred embodiment is depicted in FIG. 2.

Figure 2:
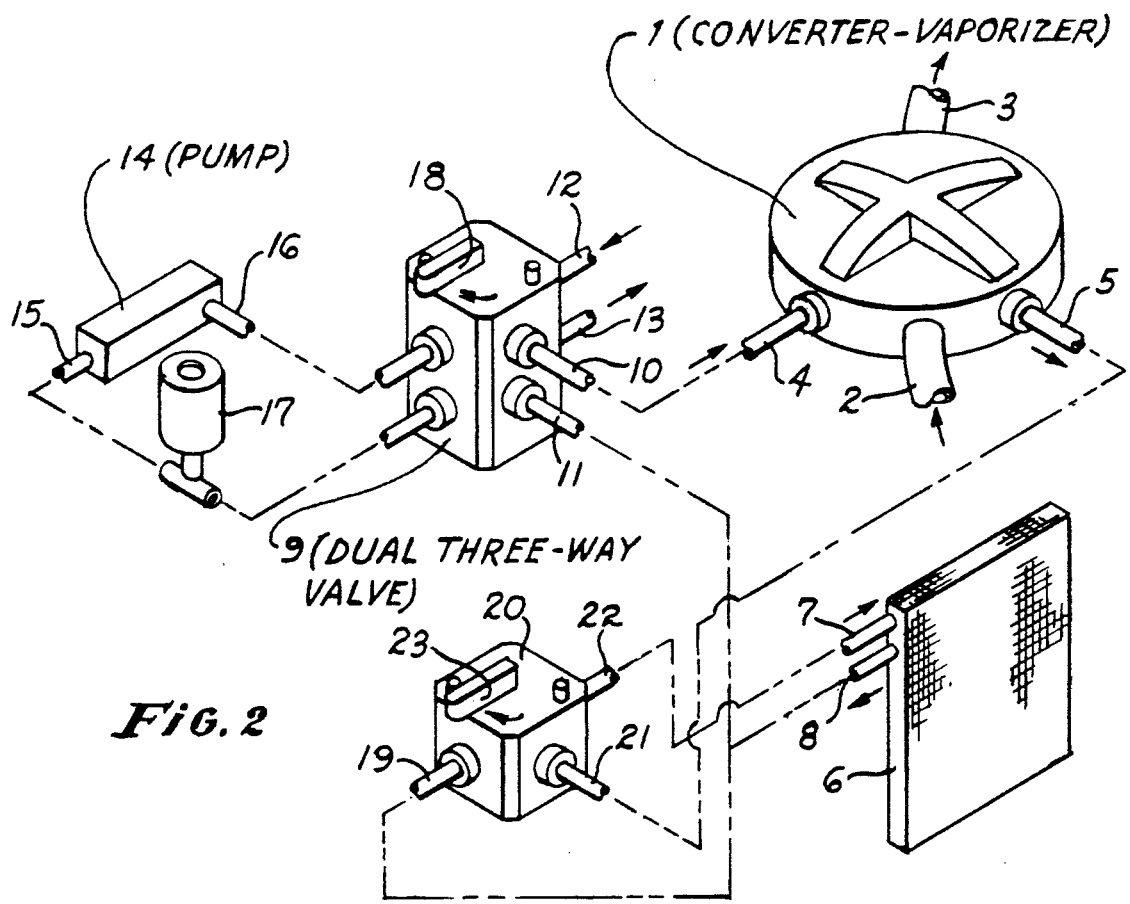
FIG. 2 is a similar view of an alternate embodiment.

FIG. 2 differs from FIG. 1 only in provision for a third three-way valve 20 at the point where fluid enters air-fluid heat exchanger 6. This is an alternate embodiment of my invention as might be desired should the vehicle or application be such that exclusion of engine heat from the human-occupied compartment is for some reason (or on some occasions) desired. Third three-way valve 20 has two positions, a first position in which the fluid coming from LPG converter 1 is allowed to pass through air-fluid heat exchanger 6, entering fluid inlet port 7 and leaving fluid outlet port 8, and a second position in which fluid inlet port 7 is blocked, and the fluid coming from LPG converter 1 passes directly into the outlet tube (an extension of fluid outlet port 8). In the figure, the fluid path in the first position is from line 5 to line 21 out line 22 to inlet port 7 and from outlet port 8 to dual three-way valve's line 11. In the second position, fluid flow is from line 5 to line 21 of three way valve 20, out line 19 and into dual three-way valves line 11, (line 22 being a dead end at valve 20) using a tee connection.

It should be noticed that, in both embodiments of my invention, when the human-compartment heater does double duty as a heater for the compartment as well as a cooler the fluid path as a heater is not defined in either FIG. 1 or FIG. 2. The art for making such connections is simply not germane to my invention. Moreover, it is well known. Also the art (whether simple tee connections at air-fluid heat exchanger 6 or incorporating shut-off on three-way valves) varies from installation to installation as a design choice of those skilled in the conventional art. These remarks obviously do not apply when air-fluid heat exchanger 6 is separate from the human compartment heater.

My invention having been described in preferred embodiments, it is clear that those skilled in the art can make modifications without use of the inventive faculty. Therefore, the scope of the invention is to be regarded as the scope of the following claims:

I claim:

1. In apparatus having both a liquid petroleum gas internal combustion engine cooled by circulating liquid through a heat exchanger and a human-occupied compartment, a system for providing cooling to the compartment from the heat of vaporization of the liquid petroleum fuel being used, comprising the combination of:

an air-fluid heat exchanger in the human-occupied compartment, and a converter in which liquid petroleum gas is expanded to the vapor phase and heated to above the ambient atmospheric dew point by fluid on its way to said air-fluid heat exchanger prior to being ducted to the internal combustion engine, the cooled fluid emerging from said converter being connected to said air-fluid heat exchanger inlet port, and a centrifugal pump moving the fluid from the outlet port of said air-fluid heat exchanger to said converter through a dual three-way valve discussed below, and an air-separator vessel located above said centrifugal pump, containing the fluid being pumped and connected to the inlet side of said centrifugal pump, and a dual three-way valve operated by a common rotary shaft, the first three-way valve being always connected to the fluid-inflow port of said converter and alternatively connected to either the discharge port of said centrifugal pump as a first alternative or to the higher-pressure portion of the engine coolant circulating system as a second alternative, and the second three-way valve being always connected to the fluid-outflow port of said air-fluid heat exchanger and alternatively connected to either the inlet side of said centrifugal pump as a first alternative or to the lower-pressure portion of the engine coolant circulating system as a second-alternative, the common rotary shaft ensuring that the both three-way valves are positioned toward either the first alternative given above or the second alternative given above.

whereby when said dual three-way valve is in the first alternative position heat of vaporization is supplied only from the human-occupied compartment and when said valve is in the second alternative position the heat of vaporization is supplied in part from the liquid circulating within the engine-cooling system and in part from the human-occupied compartment, in both positions providing cooling to the compartment.

2. Apparatus as described in claim 1, further comprising:

a three-way valve permanently connected to the fluid output port of said converter for liquid petroleum gas, having a first position directing this fluid to said air-fluid heat exchanger and a second position directing this fluid to the fluid-outflow port of air-fluid heat exchanger by means of a tee connection, whereby said three-way valve directs the fluid from said converter through said air-fluid heat exchanger when in the first position and bypasses said air-fluid heat exchanger when in the second position independently of said dual three-way valve.

* * * * *